April 11, 1961  G. S. ALLIN, SR  2,979,205
HYDRAULIC TANK AND RADIATOR GUARD
Filed April 8, 1959
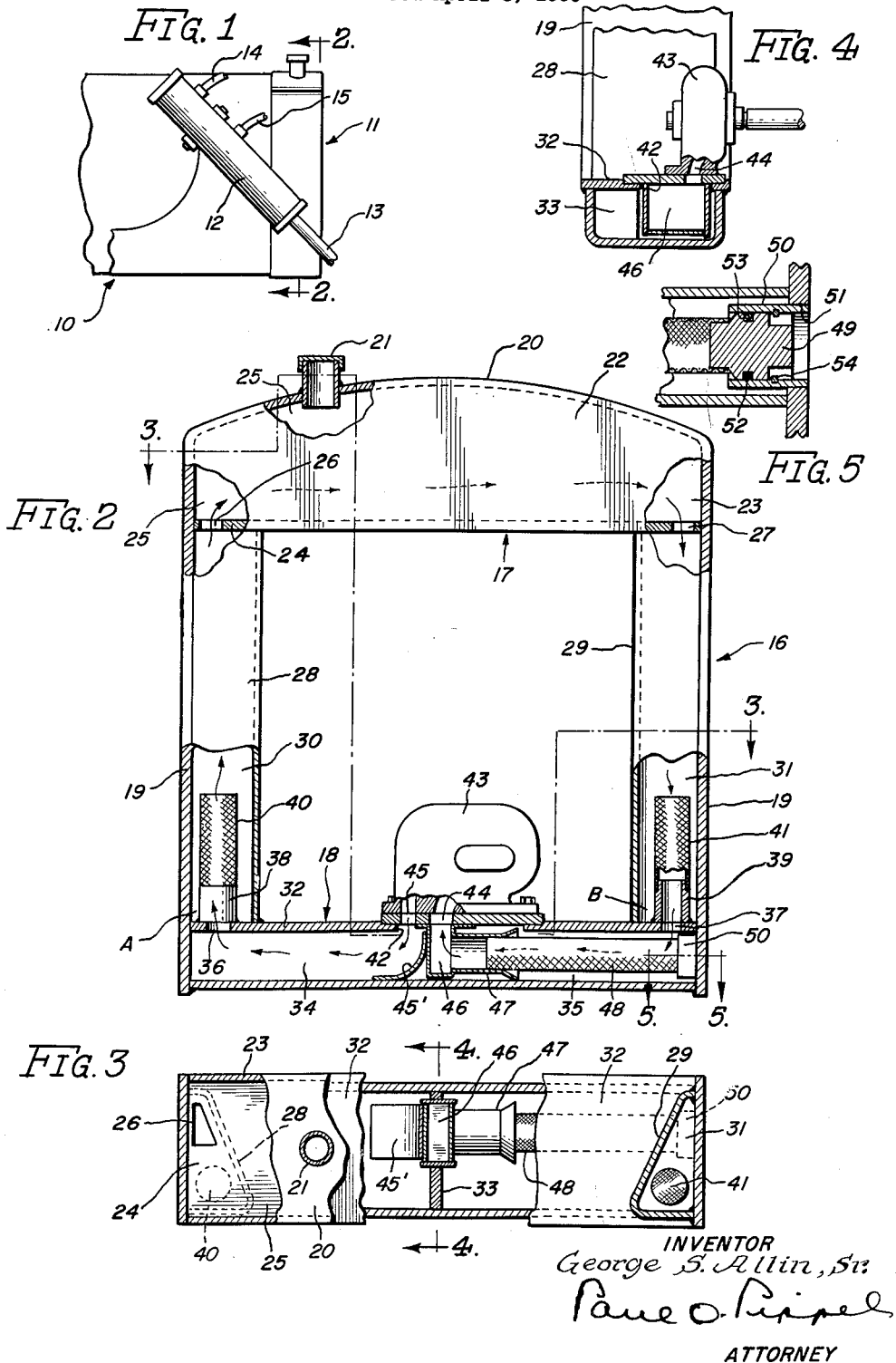
INVENTOR
George S. Allin, Sr.
ATTORNEY United States Patent Office 2,979,205
Patented Apr. 11, 1961

2,979,205
HYDRAULIC TANK AND RADIATOR GUARD

George S. Allin, Sr., Flossmoor, Ill., assignor to International Harvester Company, Chicago, Ill., a corporation of New Jersey Filed Apr. 8, 1959, Ser. No. 804,998

3 Claims. (Cl. 210—167)

This invention relates to hydraulic tanks and particularly to a combined hydraulic tank and radiator guard. More specifically, the invention relates to an improved hydraulic tank particularly adapted for vehicles and including an improved filtering arrangement.

It is a prime object of this invention to provide an improved hydraulic tank particularly adapted for use with earth-working vehicles of the tractor type.

A still further object is to provide an improved hydraulic tank and radiator guard including an improved filtering arrangement particularly effective to filter sediment from hydraulic fluid accumulating incident to the operations of earth-working equipment.

A still further object is to provide an improved, effective and simple filtering arrangement for hydraulic tanks used in connection with earth-working equipment, the said filtering arrangement requiring minimum maintenance effort in the cleaning of sediment from the hydraulic tank.

A still further object is the provision of an improved hydraulic tank useful in connection with closed systems of hydraulic earth-working equipment, the said tank including a novel arrangement of passages and chambers designed to effectively filter hydraulic fluid and to provide a simple means whereby the sediment may be removed from the filtering chambers.

A still further object is the provision of an improved hydraulic tank useful in connection with operations where a large amount of sediment finds its way into the hydraulic fluid, the said tank including a novel arrangement of filtering chambers wherein at least one chamber is designed to accumulate sediment and to be retained therein out of the path of the hydraulic fluid during the normal life of the equipment with which the hydraulic tank is utilized.

These and further objects will become more readily apparent from a reading of the description when examined in connection with the accompanying sheet of drawing.

In the drawing:

Fig. 1 is a fragmentary side view of a portion of a vehicle having an improved hydraulic tank and radiator guard connected thereto;

Fig. 2 is a front view taken substantially along the line 2—2 of Fig. 1 showing a combined hydraulic tank and radiator guard with certain portions broken away to better illustrate the invention;

Fig. 3 is a cross-sectional view through a hydraulic tank and radiator guard substantially taken along the line 3—3 of Fig. 2;

Fig. 4 is a cross-sectional view taken along the line 4—4 of Fig. 3; and

Fig. 5 is a fragmentary cross-sectional view taken substantially along the line 5—5 of Fig. 2.

Referring now particularly to Fig. 1, the front or engine portion of a vehicle is generally designated by the reference character 10. A hydraulic tank and radiator guard 11 is shown mounted on the engine portion 10. The engine portion 10 may form a portion of a crawler type tractor of a type which may be used in connection with bulldozing or grading equipment. In bulldozers and similar equipment it is customary to connect the implement to the tractor frame in such a way that it may be raised and lowered, tilted, angled, etc., by hydraulic power means. In constructions of this nature it is also necessary to generally provide a suitable guard for protecting the radiator of the vehicle. Such radiator guards have also been utilized as hydraulic tanks by the construction of chamber arrangements and pump devices whereby fluid under power may be forced to hydraulic cylinders mounted on the tractor. Such a cylinder is shown in Fig. 1 and is designated by the reference character 12, the cylinder 12 including a reciprocal ram 13 adapted to be reciprocated by means of fluid directed to the cylinder 12 by hose connections 14 and 15, in turn connected to a suitable valve mechanism (not shown).

As best shown in Figs. 2 through 4, the hydraulic tank and radiator guard comprises a housing or casing structure 16. The casing structure 16 comprises an upper casing portion 17 and a lower casing portion 18. Laterally spaced side members 19 extend vertically and are connected at their upper ends to a top wall 20 having a suitable conduit or filler opening 21. Front walls 22 and rear walls 23 combine with upper portions of the side walls 19, the top wall 20 and a transverse upper wall 24 to provide a chamber generally designated at 25. The transverse wall 24 is provided with vertically extending and laterally spaced openings 26 and 27. As best shown in Figs. 2 and 3, a pair of inner wall members 28 and 29 extend vertically and are suitably connected to the walls 19 to provide a pair of vertically extending passages 30 and 31.

The lower casing portion 18 includes a transverse wall 32 and a centrally located partition 33 providing separate chambers 34 and 35. The chamber 34 is in communication with the passage 30 by means of an opening 36 formed in the lower transverse wall 32, the said wall 32 being suitably connected to the lower ends of the upright or vertical wall members 28 and 29. The wall 32 is also provided with an opening 37 communicating with the passage 31 and with the chamber 35.

As best shown in Fig. 2, the openings 36 and 37 respectively communicate with upwardly extending tubular members 38 and 39 which are suitably connected to the wall 32 respectively over the openings 36 and 37. As best shown in Fig. 3 the opening 26 is offset axially or laterally with respect to the opening 36 and tubular member 38. The opening 37 is similarly offset with respect to the opening 27. The tubular members 38 and 39 are laterally spaced with respect to the side walls 19 and inner walls of the members 28 to provide traps or sediment accumulating spaces designated by A and B. Screens 40 and 41 are respectively supported on the tubular members 38 and 39. The screens 40 and 41 may be constructed in such a way that lower portions of the screens may have a relatively close mesh and the upper portions may have relatively wider mesh openings.

The transverse wall 32 is also provided with a centrally disposed opening 42 with a pump 43 positioned on the transverse wall 32 over the opening. The pump 43 includes an inlet port connection 44 and an exhaust connection 45. The pump 43 may be of a conventional type designed to force fluid through the various components of the hydraulic tank 11. The chamber 34 is also provided with an arcuate baffle 45' adapted to direct fluid from the exhaust opening 45 toward the opening 36.

An inlet housing 46 is positioned immediately beneath the pump opening 44 and is in communication therewith. The inlet housing 46 includes a horizontally extending flared conduit 47 which supports one end of a filter element 48. As best shown in Fig. 5, the filter element 48 is suitably connected to an annular support member 49 supported in a sleeve 50 which in turn is supported in an opening 51 of one of the side walls 19. An O-ring 52 is supported in an annular recess 53 on the support member 49, the said O-ring engaging the inner wall of the sleeve 50 in sealing relation. A snap ring 54 suitably connects the support member 49 and the wall 50 to support the filter element 48 in position. The filter element 48 also, as shown in Fig. 3, is positioned in laterally spaced or offset relation with respect to the opening 37 and tubular member 39.

The operation of the hydraulic cylinder 12 need not be described and it is believed sufficient to say that fluid under pressure actuates the cylinder for operating implements and equipment with which the tank is utilized.

During operation, the pump 43 directs fluid flow through the exhaust outlet 45, to the chamber 34, through the opening 36 upwardly and through the screen 40 to the passage 30. Since the cross-sectional area of the passage 30 is much larger than the opening 36 the velocity flow of the circulating oil in the passage 30 is greatly decreased. Thus heavy particles of foreign matter in the oil will settle out in the space A and will be kept out of circulation. The passage 31 is similarly larger in cross-section than the opening 37 and as fluid flows from the chamber 25 through the opening 27, into the passage 31, the velocity flow decreases and any heavy particles left in the oil will have a marked tendency to settle out and become trapped in the space B. Oil then flows into the chamber 35. The fluid then flows through the filter element 48 into the inlet housing 46 and back to the pump through the inlet opening 44. The direction of flow has been shown by the arrows. As the fluid enters into the chamber 35 partial sedimentation occurs in this chamber since the fluid is filtered to some extent by means of the filter element 48. This sedimentation which occurs in the chamber 35 causes a certain build-up of material within said chamber which may be removed by removing the filter element 48 from the sleeve 50 by merely removing the snap ring 54. As the fluid enters into the chamber 34 and flows into the passage 30 a certain amount of sedimentation also may occur within the chamber 34. Such sedimentation which occurs within this chamber may be removed by simply removing the pump 43 whereupon access is obtained through the opening 42 into the chamber 34. As the fluid flows through the passage 30 the flow velocity of the fluid is reduced since the area of passage 30 is many times larger than opening 36 and tube 38. Thus additional sedimentation occurs in the passage 30 since the fluid velocity will no longer sustain the particles and this sediment is collected into the space A. This sedimentation which occurs at the point A is prevented from re-entering the flow stream by virtue of the screen 40 and the complete stagnant zone caused by the length of stand pipe 38. As the flow continues through the chamber 25, the fluid flows down through the opening 27 into the passage 31. Since the opening 27 is also offset with respect to the tubular member 39, flow again is reduced in the passage 31 and further sedimentation may occur, the sediment collecting in the space B as indicated in Fig. 2.

The filler conduit 21 also is preferably offset with respect to the openings 26 to prevent additional foreign material entering into the passages 30 and 31 during the adding of fluid to the hydraulic tank. The pump 43 includes a suitable connection (not shown) to deliver fluid under pressure to a valve mechanism (not shown) for actuating the cylinder 12.

It is thus obvious that the chambers 34 and 35 may be very quickly and easily cleaned and maintained. The spaces A and B which collect sediment need not be cleaned since the sedimentation rate within the passages 30 and 31 will not be great enough to necessitate removal during the lifetime of the tractor to which the hydraulic tank may be attached. It is also, of course, apparent during the operation of the tractor vibration takes place, and this vibration has the effect of compacting the sediment which is collected in the spaces A and B. Thus the collection of sediment in the spaces A and B will be maintained in such spaces and it will not be necessary to remove such sediment during the life of the unit. However should sediment accumulation prove to be a problem, drain openings can easily be installed for the purposes of cleaning zones A and B.

Thus it is obvious that an improved hydraulic tank and radiator guard have been provided including a novel filtering arrangement therefor. It must be realized that various changes and modifications may be made which do not depart from the spirit of the invention as disclosed or from the scope thereof as defined in the appended claims.

What is claimed is:

1. A hydraulic tank adapted to be supported on a vehicle comprising a housing including laterally spaced upright side walls, a top wall and a bottom wall, a transversely extending upper wall below said top wall, first front and rear walls defining with said side, top and transverse upper walls a first chamber, said top wall including a fluid inlet communicating with said first chamber, a pair of vertically extending laterally spaced members, each of said vertical members being connected to said side walls to provide first and second upright passages, said upper wall having a first pair of openings, each of said openings communicating with first chamber and one of said passages, a transversely extending lower wall spaced above said bottom wall, second front and rear walls connecting said bottom and lower walls, a partition between said lower, bottom, and second front and rear walls to provide second and third chambers, said lower wall including a second pair of openings, said first and second pair of openings being smaller in cross-sectional area than the cross-sectional area of said passages, one of said second pair of openings providing communication between said first upright passage and said second chamber, said other of said second pair of openings providing communication between said second upright passage and said third chamber, a first tubular member in said first passage, a second tubular member in said second passage, said tubular members communicating with said second pair of openings and extending upwardly from said lower wall, said tubular members being spaced laterally from said side walls and vertical members to provide therebetween a pair of sediment traps, said tubular members having open upper ends offset laterally with respect to the first pair of openings, a pump supported on said lower wall, said pump having inlet and outlet ports communicating respectively with said second and third chambers, and a filter element in said third chamber communicating with said inlet port, whereby fluid from said third chamber is pumped to said second chamber through said first passage to said first chamber, to said second passage, to said third chamber and through said filter element, whereby sediment in said fluid is removably deposited in said second and third chambers and permanently in said sediment traps of said passages.

2. A hydraulic tank adapted to be supported on a vehicle comprising a housing including laterally spaced upright side walls, a top wall and a bottom wall, a transversely extending upper wall below said top wall, first front and rear walls defining with said side, top and transverse upper walls a first chamber, said top wall including a fluid inlet communicating with said first chamber, a pair of vertically extending laterally spaced members, each of said vertical members being connected to said side walls to provide first and second upright passages, said upper wall having a first pair of openings, each of said openings communicating with first chamber and one of said passages, a transversely extending lower wall spaced above said bottom wall, second front and rear walls connecting said bottom and lower walls, a partition between said lower, bottom, and second front and rear walls to provide second and third chambers, said lower wall including a second pair of openings, said first and second pair of openings being smaller in cross-sectional area than the cross-sectional area of said passages, one of said second pair of openings providing communication between said first upright passage and said second chamber, said other of said second pair of openings providing communication between said second upright passage and said third chamber, a first tubular member in said first passage, a second tubular member in said second passage, said tubular members communicating with said second pair of openings and extending upwardly from said lower wall, said tubular members being spaced laterally from said side walls and vertical members to provide therebetween a pair of sediment traps, said tubular members having open upper ends offset laterally with respect to the first pair of openings, a pump supported on said lower wall, said pump having inlet and outlet ports communicating respectively with said third and second chambers, whereby fluid from said third chamber is pumped to said second chamber through said first passage to said first chamber, to said second passage, to said third chamber, whereby sediment in said fluid is removably deposited in said second and third chambers and permanently in said sediment traps of said passages.

3. A hydraulic tank comprising a first upper transversely extending casing providing a first chamber, a second casing having second and third chambers, said second and third chambers extending transversely in adjacent relation and being spaced vertically below said first chamber, a pair of upright laterally spaced hollow members disposed between said first and second casings, said hollow members providing first and second vertical passages, said first casing including first and second ports respectively communicating with said first chamber and first and second passages, a tube in each passage, said tubes having lower open ends communicating with said second and third chambers, and upper open ends communicating with said first and second passages said passages having a larger cross-sectional area than the cross-sectional area of said ports, tubes and said openings, said tubes being arranged to provide spaces for the accumulation of sediment, pump means having a first connection communicating with said third chamber, said pump means including a second connection communicating with said second chamber, whereby fluid is pumped from one of said chambers through said first and second passages and sediment is deposited in said spaces.

References Cited in the file of this patent

UNITED STATES PATENTS

| | | |
|---|---|---|
| 224,680 | Green | Feb. 17, 1880 |
| 399,429 | McCulloch | Mar. 12, 1889 |
| 829,756 | Bartholomew | Aug. 28, 1906 |
| 1,235,438 | Chynoweth | July 31, 1917 |
| 2,082,866 | Alexander | June 8, 1937 |
| 2,460,058 | Brodeur | Jan. 25, 1949 |
| 2,672,987 | Hutchinson | Mar. 23, 1954 |
| 2,787,065 | Bock et al. | Apr. 2, 1957 |
| 2,809,753 | Atkinson | Oct. 15, 1957 |